United States Patent
Schumacher et al.

(10) Patent No.: US 8,393,250 B2
(45) Date of Patent: Mar. 12, 2013

(54) TOOL FOR STRIPPING OFF A JACKET FROM TUBES OR CABLES

(75) Inventors: Otto Schumacher, Sarstedt Ot. Heisede (DE); Peter Bernasch, Langenhagen (DE); Erhard Mahlandt, Laatzen (DE)

(73) Assignee: Alcatel Lucent, Paris (FR)

( * ) Notice: Subject to any disclaimer, the term of this patent is extended or adjusted under 35 U.S.C. 154(b) by 1772 days.

(21) Appl. No.: 11/120,943

(22) Filed: May 4, 2005

(65) Prior Publication Data

US 2005/0268749 A1 Dec. 8, 2005

(30) Foreign Application Priority Data

Jun. 4, 2004 (EP) .................................... 04291397

(51) Int. Cl.
*H02G 1/12* (2006.01)
*B21F 13/00* (2006.01)
*B21F 27/00* (2006.01)

(52) U.S. Cl. ............... 81/9.4; 30/90.1; 30/90.4; 30/90.6

(58) Field of Classification Search ............ 81/9.4–9.44, 81/9.2; 30/90.1, 91.2, 90.6, 90.3, 90.7, 90.2; 83/947

See application file for complete search history.

(56) References Cited

U.S. PATENT DOCUMENTS

| 843,353 | A | * | 2/1907 | McKenna | 30/90.1 |
| 880,790 | A | * | 3/1908 | Goehst | 30/90.6 |
| 3,585,982 | A | * | 6/1971 | Hollinshead | 126/263.1 |
| 3,601,891 | A | * | 8/1971 | Destito | 30/90.1 |
| 3,620,104 | A | * | 11/1971 | Horrocks | 30/90.1 |
| 3,881,249 | A | * | 5/1975 | Cox, Jr. | 30/90.7 |
| 4,127,937 | A | | 12/1978 | Harless et al. | |
| 4,189,799 | A | * | 2/1980 | Litehizer, Jr. | 7/107 |
| 6,622,386 | B2 | * | 9/2003 | Miller et al. | 30/90.1 |

FOREIGN PATENT DOCUMENTS

| DE | 401 204 | C | | 8/1924 |
| DE | 401204 | | * | 8/1924 |
| EP | 0 990 929 | A2 | | 4/2000 |
| JP | 55114527 | | * | 9/1980 |
| JP | 55114527 | A | * | 9/1980 |

* cited by examiner

*Primary Examiner* — Bryan R Muller
(74) *Attorney, Agent, or Firm* — Sughrue Mion, PLLC

(57) ABSTRACT

A tool for stripping off a jacket from tubes or cables is characterized by a bend adapted to an outer diameter of the duct or cable to be stripped, and a blade protruding from the bend to the interior of the bend. The invention provides a cost-effective, accurate and easily producible tool for stripping off a jacket from tubes or cables.

9 Claims, 2 Drawing Sheets

TOOL FOR STRIPPING OFF A JACKET FROM TUBES OR CABLES

BACKGROUND OF THE INVENTION

The invention is based on a priority application EP 04291397.0 which is hereby incorporated by reference.

The invention relates to a tool for stripping off a jacket from tubes or cables.

During installation of cables with an insulation jacket there is a need for stripping off the insulation jacket in order to be able to connect the surface of the conducting interior part of the cable (inner cable) to connectors or grounding couplers. Especially in the case of coaxial cables, it is important to strip off the insulation jacket entirely without damaging the outer conductor of the inner cable.

For this purpose, knives may be used. However, knives are inaccurate tools and may damage the inner cable. Several tools are available in order to circumvent this problem. However, they are complex and costly to produce.

In U.S. Pat. No. 4,127,937 a tool for cutting insulation jackets from electrical cables is described, facilitating subsequent stripping of the insulation. The cutting tool is suitable for cutting the cable both axially and circumferentially. For this purpose, the tool comprises a handle rigidly affixed to the cable and an opposed, pivotally supported blade-and-handle assembly.

EP 0 990 929 A2 describes a method and an apparatus for stripping an outer jacket from a fiber optic cable. The apparatus comprises an upper and a lower cutting surface between which the fiber optic cable is disposed. The cutting surfaces cut through the circumference of the outer jacket.

SUMMARY OF THE INVENTION

It is the object of the invention to provide a tool for stripping off a jacket from tubes or cables, without damaging the surface of the inner cable.

This object is achieved by a tool with a bend adapted to an outer diameter of the tube or cable to be stripped, and a blade protruding from the bend to the interior of the bend.

The invention provides a cost-effective, accurate and easily producible tool for stripping off the jacket from tubes or cables. The radial protruding width of the blade is adapted to the width of the jacket, such that only the insulation jacket is stripped off, exposing the surface of the inner cable without damaging it.

In a preferred embodiment of the invention the bend has a U-formed shape and a diameter of the bend is adapted to a diameter of the tube or cable to be stripped. The cable fits exactly into the bend and the blade can cut through the whole width of the coating.

In a further embodiment the blade and the circumference of the bend form an acute angle. If the blade is positioned in an acute angle relative to the jacket of the cable, cutting of the jacket is facilitated.

In another embodiment an axial length of the blade is adapted to an axial length of the jacket to be stripped off. Stripping off a precise length of the jacket is especially important if grounding couplers have to be connected at positions along the cable.

In a preferred embodiment cutting edges of both axial ends of the blade are perpendicular to an axial direction. After cutting of the cable, cutting edges of the jacket run perpendicular to the axial direction of the cable, thus facilitating the connection of the surface of the inner cable to connectors and other equipment.

In a further preferred embodiment, the bend is formed by a bended part of a flat plate and the blade is formed by a tongue-shaped, cut-out part of the bend. The tool according to the invention can be easily produced from a flat plate, thus reducing production costs.

In a further embodiment of the invention the flat plate has at least one snap-in part at the edge of the plate protruding from the plate in such a way that the cable can be retained inside the bend. Fixing of the tool to the tube or cable prevents the tool from falling down when the user loses hold of the tool.

In another preferred embodiment the bend comprises two tongue-shaped, cut-out handling parts protruding from the bend to the exterior of the bend and each handling part comprises a hole for inserting a handle. If a handling element, such as a screwdriver, is pushed through both of the holes, a cost-effective handle for the tool can be provided.

In an alternative embodiment of the invention, a handle is connected to the bend by a pivoting element. The handle serves as a lever arm and increases the stripping force on the coating. It can be rotated from a radial position to an axial position in order to save transport space and for easily using the tool when stripping in a cramped environment.

In a further preferred embodiment, the bend has two axial guiding sections between which the blade is provided. This allows stripping off a part of the jacket with an accurate length.

Further advantages may be extracted from the description and the enclosed drawings. The features mentioned above and below may be used in accordance with the invention either individually or collectively in any combination. The embodiments mentioned are not to be understood as an exhaustive enumeration but rather have an exemplary character for the description of the invention.

DETAILED DESCRIPTION OF THE DRAWINGS

Figure 1:
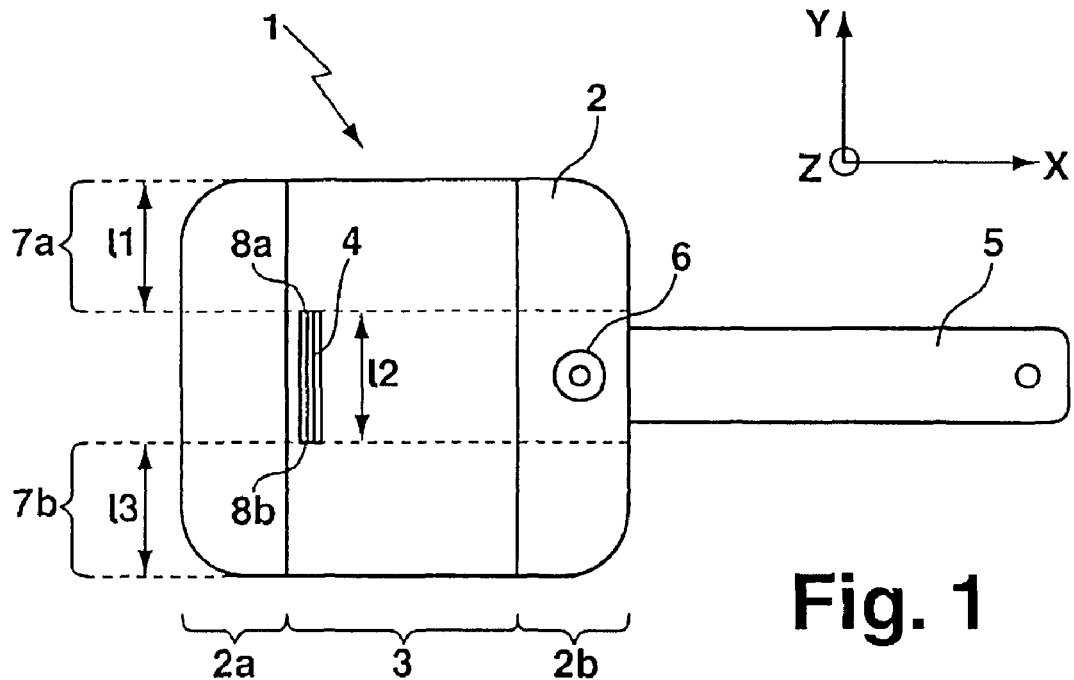
FIG. 1 shows a top view of an embodiment of a tool in accordance with the invention.

FIG. 1 shows a tool 1 for stripping off insulation jackets from tubes or cables. The tool 1 comprises a plate 2 with a bend 3 which forms a U-formed, bended part of the plate 2. The bend 3 is provided between a first and a second flat part 2a, 2b of the plate 2 in a radial direction (x-axis). A tongue-shaped, cut-out part of the bend 3 forms a blade 4 which protrudes to the interior of the bend 3 under an acute angle to the circumference of the bend 3.

The second flat part 2b of the plate 2 is connected to a handle 5 by a pivoting element 6. The handle 5 can be rotated by the pivoting element from the radial position shown in FIG. 1 to an axial position used for transportation or if stripping of cables in a cramped environment is necessary.

The plate 2 has two axial guiding sections 7a, 7b along the axial direction (y-axis), between which the blade 4 is provided. An axial length 12 of the blade 4 is as long as an axial length of either of the two axial guiding sections 11, 13. The blade 4 comprises cutting edges at two axial ends 8a, 8b which are perpendicular to the axial direction (y-axis).

Figure 2:
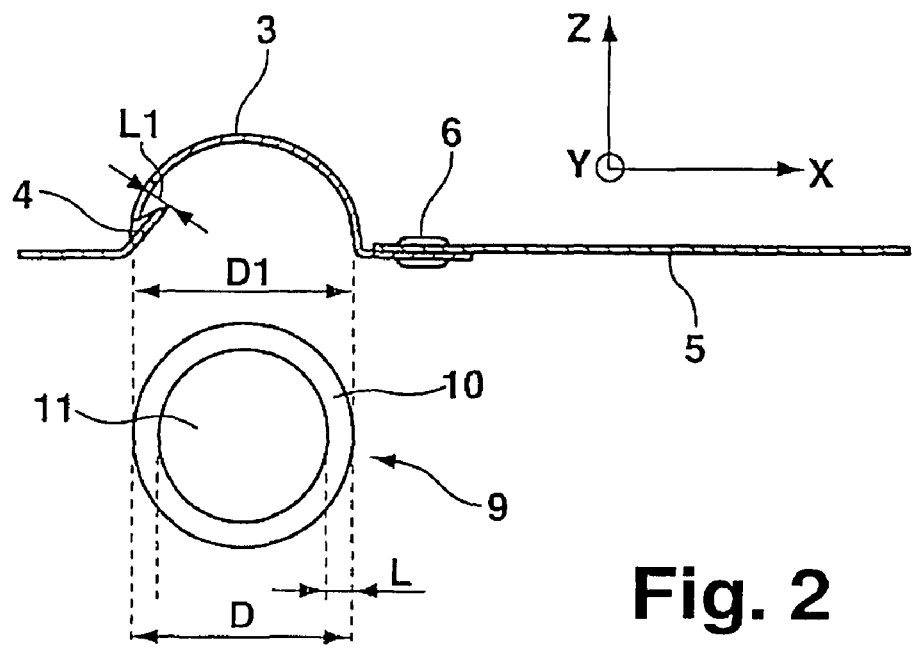
FIG. 2 shows a cross-section of the tool of FIG. 1 with a cross-section of a cable.

FIG. 2 shows a cross-section of the tool 1 with a coaxial cable 9 to be stripped. The cable 9 has a jacket 10 of width L and an inner cable 11 which comprises an inner and an outer conductor (not shown). A diameter D of the coaxial cable 9 is identical to a diameter D1 of the bend 3 of the tool 1. A protruding width L1 of the blade 4 is equal to a width L of jacket 10 of the coaxial cable 9.

For stripping off the jacket 10 of the coaxial cable 9, the coaxial cable 9 is first inserted into the bend 3 of the tool 1. As the jacket 10 is made of a flexible material, the coaxial cable 9 can be made to fit exactly into the bend 4, although the blade 4 protrudes to the interior of the bend 3. Stripping off of the jacket 10 is brought about by a 360 degree rotation of the tool 1 about the y-axis. Thus, the jacket 10 is stripped off entirely and the surface of the inner cable 11 is exposed.

As cut edges of the jacket 10 of the coaxial cable 9 run perpendicular to the axial direction of the cable and the cut-out part of the jacket 10 has the exact length 12 of the blade 4, grounding couplers can be fixed to the cable in such a way that the non-isolated part of the cable 9 and the couplers form a sealed-up entity protecting the inner cable from ingression of water or dirt.

Figure 3:
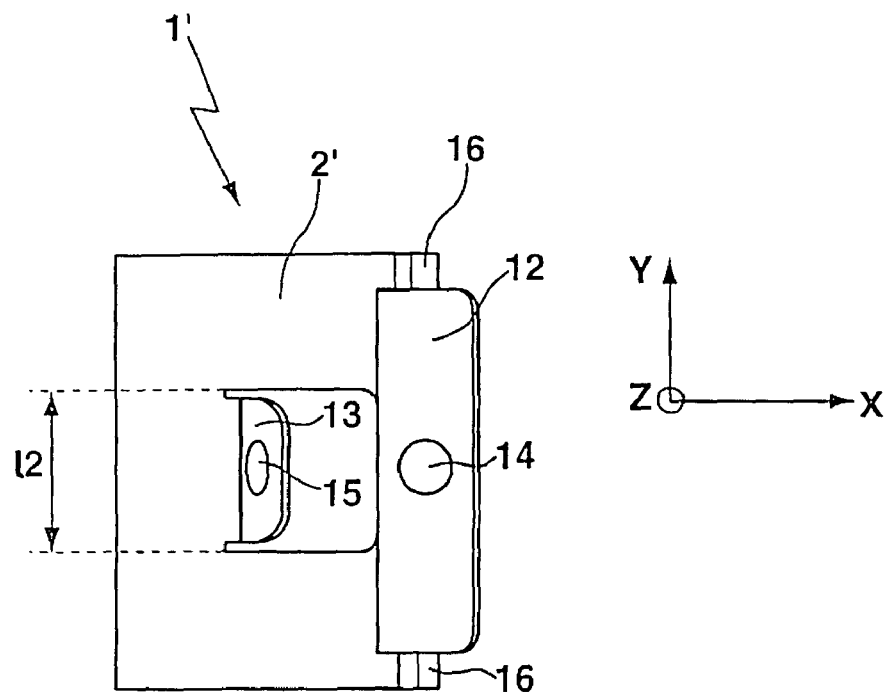
FIG. 3 shows a top view of another embodiment of a tool in accordance with the invention.
Figure 4:
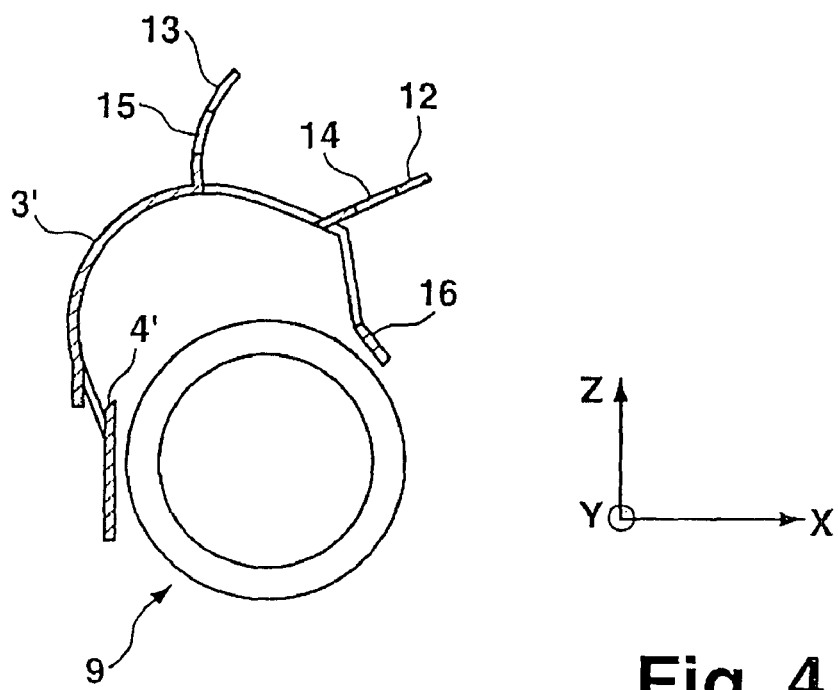
FIG. 4 shows a cross-section of the tool of FIG. 3 with a cross-section of a cable.

FIG. 3 and FIG. 4 show a tool 1' for stripping off jackets from tubes or cables 9 similar to the tool 1 shown in FIG. 1 and FIG. 2. The tool 1' has a plate 2' comprising a bend 3' which forms a U-formed bended part of the plate 2' and a blade 4' protruding to the interior of the bend 3'. The axial length 12 of the blade 4' corresponds to the axial length of that part of the jacket which has to be stripped off from the cable 9. The tool 1' differs from the tool 1 of FIG. 1 and FIG. 2 in that the bend 3' has a first and a second tongue-shaped, cut-out handling part 12, 13 protruding to the exterior of the bend 3'. The first handling part 12 has a first hole 14 and the second handling part 13 has a second hole 15. For handling of the tool 1' a screwdriver may be put through both holes 14, 15 providing the tool 1' with a handle. In order to retain the cable 9 inside of the bend 3', two snap-in parts 16 are provided at the edge of the plate 2' protruding from the plate 2' in such a way that the cable 9 is held back inside the bend 3'.

The invention claimed is:

1. A tool for stripping off a jacket from tubes or cables comprising a bend adapted to an outer diameter of the tube or cable to be stripped, and a blade protruding from the bend to the interior of the bend, wherein the bend is formed by a bended part of a flat plate and the blade is formed by a tongue-shaped, cut-out part of the bend, wherein the blade comprises a cutting edge extending in an axial direction that is parallel to an axial direction of the tubes or cables to be stripped and cutting edges at both axial ends of the blade that are perpendicular to the cutting edge extending in the axial direction.

2. The tool according to claim 1, characterized in that the bend has a U-formed shape and that a diameter of the bend is adapted to the outer diameter of the tube or cable to be stripped.

3. The tool according to claim 1, characterized in that the blade and the circumference of the bend form an acute angle.

4. The tool according to claim 1, characterized in that an axial length of the blade corresponds to an axial length of the jacket to be stripped off.

5. The tool according to claim 1, characterized in that a handle is connected to the bend by a pivoting element.

6. The tool according to claim 1, characterized in that the bend has two axial guiding sections between which the blade is provided.

7. The tool according to claim 1, wherein the flat plate extends axially, from each side of the blade and in the direction that is parallel to the longitudinal axial direction of the tubes or cables to be stripped, by an amount equal to a length of the blade measured in a same axial direction.

8. The tool according to claim 1, wherein the blade is structured so that rotating the tool about a jacket for a tube or cable to be stripped exposes an inner conductor of the tube or cable by a length corresponding to an axial length of the blade.

9. The tool according to claim 8, wherein the blade is structured so that cut edges of the jacket that result from rotating the tool about the jacket are perpendicular to the axial direction of the tube or cable, and said inner conductor is exposed at an intermediate position of the tube or cable such that the jacket remains on the tube or cable at a first axial end of the exposed inner conductor and at a second axial end of the exposed inner conductor.

* * * * *